US012738095B2

(12) United States Patent
Zhang et al.

(10) Patent No.: US 12,738,095 B2
(45) Date of Patent: Sep. 15, 2026

(54) OBJECT EMOTION ANALYSIS METHOD AND APPARATUS AND ELECTRONIC DEVICE

(71) Applicant: NETEASE (HANGZHOU) NETWORK CO., LTD., Hangzhou (CN)

(72) Inventors: Wei Zhang, Hangzhou (CN); Feng Qiu, Hangzhou (CN); Yu Ding, Hangzhou (CN); Hao Zeng, Hangzhou (CN); Suzhen Wang, Hangzhou (CN); Zhimeng Zhang, Hangzhou (CN); Bowen Ma, Hangzhou (CN); Rudong An, Hangzhou (CN); Tangjie Lv, Hangzhou (CN); Changjie Fan, Hangzhou (CN); Zhipeng Hu, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 186 days.

(21) Appl. No.: 18/563,992

(22) PCT Filed: Sep. 13, 2022

(86) PCT No.: PCT/CN2022/118365

§ 371 (c)(1),
(2) Date: Nov. 24, 2023

(87) PCT Pub. No.: WO2023/226239

PCT Pub. Date: Nov. 30, 2023

(65) Prior Publication Data

US 2025/0078569 A1 Mar. 6, 2025

(30) Foreign Application Priority Data

May 24, 2022 (CN) ........................ 202210574835.2

(51) Int. Cl.

*G06V 40/16* (2022.01)
*G06V 10/80* (2022.01)
*G06V 10/82* (2022.01)

(52) U.S. Cl.

CPC .......... *G06V 40/174* (2022.01); *G06V 10/809* (2022.01); *G06V 10/82* (2022.01); *G06V 2201/10* (2022.01)

(58) Field of Classification Search

None

See application file for complete search history.

(56) References Cited

U.S. PATENT DOCUMENTS 8,401,248 B1 * 3/2013 Moon .................... G06V 40/18 382/103

2009/0198148 A1 * 8/2009 Lonky .................... A61B 3/113 382/117

(Continued)

FOREIGN PATENT DOCUMENTS

CN 108446601 A 8/2018

CN 108985358 A 12/2018

(Continued)

OTHER PUBLICATIONS

Shizhe Chen and Qin Jin. 2016. Multi-modal Conditional Attention Fusion for Dimensional Emotion Prediction. In Proceedings of the 24th ACM international conference on Multimedia (MM '16). Association for Computing Machinery, New York, NY, USA, 571-575. (Year: 2016).*

(Continued)

*Primary Examiner* — Sath V Perungavoor

(74) *Attorney, Agent, or Firm* — BCF LLP

(57) ABSTRACT

An object emotion analysis method and apparatus and an electronic device are provided. The method includes: extracting a static facial feature and a dynamic feature from multimedia data associated with a target object, wherein the (Continued)

dynamic feature includes one or more of an expression change feature, a sound feature and a language content feature: inputting the static facial feature and the dynamic feature into a pre-trained object emotion analysis model, fusing the static facial feature and the dynamic feature by the object emotion analysis model, and outputting an emotion analysis result.

18 Claims, 4 Drawing Sheets

(56) References Cited

U.S. PATENT DOCUMENTS

| | | | | |
|---|---|---|---|---|
| 2019/0311188 | A1 | 10/2019 | Qing et al. | |
| 2022/0138472 | A1 * | 5/2022 | Mittal .................... | G06N 3/048 382/181 |

FOREIGN PATENT DOCUMENTS

| | | |
|---|---|---|
| CN | 111274978 A | 6/2020 |
| CN | 113822192 A | 12/2021 |

OTHER PUBLICATIONS

D. Hazarika, S. Gorantla, S. Poria and R. Zimmermann, "Self-Attentive Feature-Level Fusion for Multimodal Emotion Detection," 2018 IEEE Conference on Multimedia Information Processing and Retrieval (MIPR), Miami, FL, USA, 2018, pp. 196-201, doi: 10.1109/MIPR.2018.00043. (Year: 2018).*

D. Priyasad, T. Fernando, S. Denman, S. Sridharan and C. Fookes, "Attention Driven Fusion for Multi-Modal Emotion Recognition," ICASSP 2020—2020 IEEE International Conference on Acoustics, Speech and Signal Processing (ICASSP), 2020, pp. 3227-3231, doi: 10.1109/ICASSP40776.2020.9054 (Year: 2020).*

T. Wang, Y. Hou, D. Zhou and Q. Zhang, "A Contextual Attention Network for Multimodal Emotion Recognition in Conversation," 2021 International Joint Conference on Neural Networks (IJCNN), Shenzhen, China, 2021, pp. 1-7, doi: 10.1109/IJCNN52387.2021.9533718. (Year: 2021).*

S. Lee, D. K. Han and H. Ko, "Multimodal Emotion Recognition Fusion Analysis Adapting BERT With Heterogeneous Feature Unification," in IEEE Access, vol. 9, pp. 94557-94572, 2021, doi: 10.1109/ACCESS.2021.3092735. (Year: 2021).*

B. Mocanu and R. Tapu, "Audio-Video Fusion with Double Attention for Multimodal Emotion Recognition," 2022 IEEE 14th Image, Video, and Multidimensional Signal Processing Workshop (IVMSP), Nafplio, Greece, 2022, pp. 1-5, doi: 10.1109/IVMSP54334.2022.9816349. (Year: 2022).*

Y. Zhang, N. Zhang, Y. Liu, C. Ma and D. Wang, "A Multimodal Emotion Recognition Method Based on Speech-Text," 2022 11th International Conference of Information and Communication Technology (ICTech)), Wuhan, China, 2022, pp. 411-414, doi: 10.1109/ICTech55460.2022.00088. (Year: 2022).*

L. Xu and M. Xu, "Shift Window Based Framework for Emotional Change Detection of Speech," 2009 Sixth International Conference on Fuzzy Systems and Knowledge Discovery, Tianjin, China, 2009, pp. 458-462, doi: 10.1109/FSKD.2009.9. (Year: 2009).*

International Search Report and Written Opinion with regard to PCT/CN2022/118365 mailed Nov. 30, 2022.

Pan et al., "Video-based facial expression recognition using multimodal deep convolutional neural networks", Optics and Precision Engineering, Apr. 2019, vol. 27, No. 4, 8 pages.

Office Action with regard to the counterpart CN Patent Application No. 202210574835.2 mailed Oct. 13, 2025.

Search Report with regard to the counterpart CN Patent Application No. 202210574835.2 issued May 24, 2022.

* cited by examiner

OBJECT EMOTION ANALYSIS METHOD AND APPARATUS AND ELECTRONIC DEVICE

CROSS-REFERENCE TO RELATED APPLICATIONS

The present disclosure is the U.S. National Stage Application of PCT/CN2022/118365, filed on Sep. 13, 2022, which is based on and claims priority to Chinese Patent Application No. 202210574835.2, entitled "Object Emotion Analysis Method and Apparatus and Electronic Device", filed on May 24, 2022, the entire contents of both of which are incorporated by reference herein for all purposes.

TECHNICAL FIELD

The present disclosure relates to the field of artificial intelligence technologies, and particularly to an object emotion analysis method and apparatus and an electronic device.

BACKGROUND

In some related art, during analysis of a facial emotion of a human face object or another object, various manners of facial action unit, basic emotion type detection, valence-arousal, or the like, may be used for the analysis. In these manners, facial features of the object are required to be extracted from an image, and emotion analysis is performed on the facial features by a deep learning model to obtain an emotion analysis result of the object. Since the facial features include various interference factors, such as illumination, occlusion, facial personalized features, or the like, the interference factors may influence learning or extraction of emotion-related feature information by the deep learning model from the facial features, resulting in low accuracy of the emotion analysis result output by the deep learning model.

SUMMARY

In some aspects, the present disclosure provides an object emotion analysis method, including: acquiring multimedia data associated with a target object, and extracting a static facial feature and a dynamic feature of the target object from the multimedia data, where the dynamic feature includes at least one of an expression change feature, a sound feature or a language content feature of the target object; and inputting the static facial feature and the dynamic feature into an object emotion analysis model, wherein the object emotion analysis model is pre-trained, fusing the static facial feature and the dynamic feature by the object emotion analysis model to obtain a fusion feature, and outputting an emotion analysis result of the target object based on the fusion feature.

In some aspects, the present disclosure further provides an electronic device, including a processor and a memory, where the memory stores machine executable instructions executable by the processor, and the processor is configured to execute the machine executable instructions to implement an object emotion analysis method, the object emotion analysis method including: acquiring multimedia data associated with a target object, and extracting a static facial feature and a dynamic feature of the target object from the multimedia data, where the dynamic feature includes at least one of an expression change feature, a sound feature or a language content feature of the target object; and inputting the static facial feature and the dynamic feature into an object emotion analysis model, wherein the object emotion analysis model is pre-trained, fusing the static facial feature and the dynamic feature by the object emotion analysis model to obtain a fusion feature, and outputting an emotion analysis result of the target object based on the fusion feature.

In some aspects, the present disclosure further provides a non-transitory machine-readable storage medium, where the machine-readable storage medium stores machine executable instructions, and when invoked and executed by a processor, the machine executable instructions cause the processor to implement an object emotion analysis method, the object emotion analysis method including: acquiring multimedia data associated with a target object, and extracting a static facial feature and a dynamic feature of the target object from the multimedia data, where the dynamic feature includes at least one of an expression change feature, a sound feature or a language content feature of the target object; and inputting the static facial feature and the dynamic feature into an object emotion analysis model, wherein the object emotion analysis model is pre-trained, fusing the static facial feature and the dynamic feature by the object emotion analysis model to obtain a fusion feature, and outputting an emotion analysis result of the target object based on the fusion feature.

BRIEF DESCRIPTION OF DRAWINGS

To describe the technical solutions in the specific embodiments of the present disclosure or the related art more clearly, the following briefly describes the drawings required for describing the specific embodiments or the related art. Apparently, the drawings in the following description show some embodiments of the present disclosure, and a person of skill in the art may still derive other drawings from these drawings without paying creative efforts.

DETAILED DESCRIPTION

Figure 1:
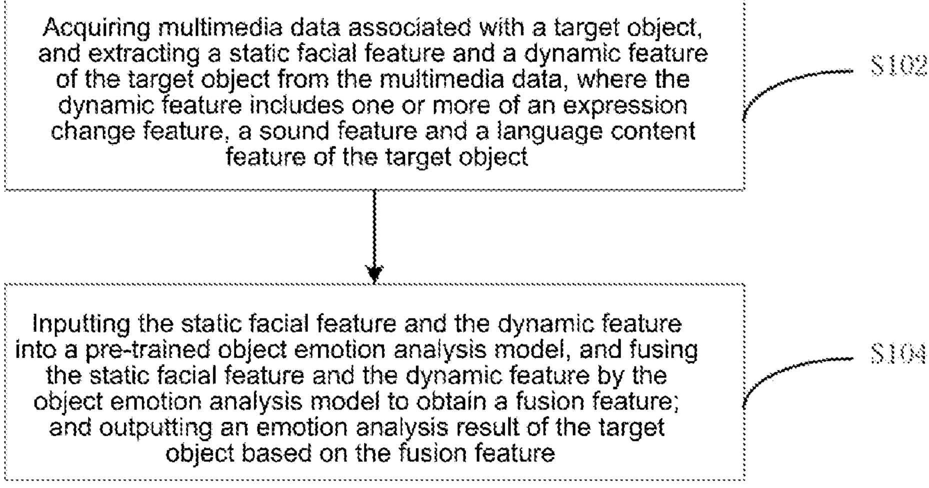
FIG. 1 is a flow chart of an object emotion analysis method provided in one or more embodiments of the present disclosure.

To make the objectives, technical solutions and advantages of the embodiments of the present disclosure clearer, the technical solutions of the present disclosure are clearly and completely described with reference to the, and apparently, the described embodiments are not all but a part of the embodiments of the present disclosure. All other embodiments obtained by a person of skill in the art based on the embodiments of the present disclosure without creative efforts shall fall within the protection scope of the present disclosure.

Reference will now be described in detail to examples, which are illustrated in the drawings. The following description refers to the drawings in which the same numbers in different drawings represent the same or similar elements unless otherwise represented. The examples described following do not represent all examples consistent with the present disclosure. Instead, they are merely examples of devices and methods consistent with aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment", "an embodiment", "an example", "some embodiments", "some examples" or similar language means that a particular feature, structure or characteristic described is included in at least one embodiment or example. Features, structures, elements, or characteristics described in connection with one or some embodiments are also applicable to other embodiments, unless expressly specified otherwise.

The term "and/or" in the present application indicates only an association relationship describing associated objects, meaning that there may be three kinds of relationships. For example, A and/or B may indicate three situations: there is only A, there are both A and B, and there is only B.

In some related art, when performing emotion analysis by a facial action unit (AU), taking a human face as an example, human face key points are required to be introduced as local information to supervise training of a deep learning model, and a common method is to use the human face key points as supervision information to allow the deep learning model to complete multi-task training of the human face key points and the facial action unit, resulting in a high learning pressure of the model: moreover, since the human face key points contain personalized identity information, such as human face appearance, the model is prone to be over-fitted to identification of identity information, resulting in low accuracy of an emotion analysis result output by the model.

During emotion analysis by basic emotion type detection, an analysis result is prone to be influenced by complex factors, such as occlusion of the human face, illumination, or the like. In addition, since basic emotion types have large internal variance, and meanwhile, different types also have similar and ambiguous features, the emotion analysis result of the model established based on the basic emotion types has large uncertainty.

When emotion analysis is performed by valence-arousal (VA for short), it requires to rely on relevant data of the facial action unit, and the situation that the model is over-fitted to the identification of the personalized identity information to result in low accuracy of the emotion analysis result is also prone to occur.

Based on the above, embodiments of the present disclosure provide an object emotion analysis method and apparatus and an electronic device, which technology can be applied to scenarios of analysis of emotions of human face objects, animal objects or other objects with emotion fluctuations, and can reduce, to a certain extent, an influence of an interference feature in a static facial feature on an emotion analysis result, and strengthen a role of feature information characterizing an emotion, thereby improving accuracy of the emotion analysis result.

To facilitate understanding of the present embodiment, an object emotion analysis method according to an embodiment of the present disclosure is first described in detail, and as shown in FIG. 1, the method includes the following steps:

step S102: acquiring multimedia data associated with a target object, and extracting a static facial feature and a dynamic feature of the target object from the multimedia data, where the dynamic feature includes one or more of an expression change feature, a sound feature and a language content feature of the target object.

The multimedia data may include data in a variety of formats, such as a video, an image, an audio, a text, or the like. The present embodiment is intended to analyze the target object, and thus, the multimedia data is usually associated with the target object, for example, the target object being included in a video, the target object being included in an image, a sound emitted by the target object being included in an audio, speaking content being included in a text or content being output in other forms. The target object here may be a human, an animal, a biomimetic robot or other objects with emotion fluctuations.

The static facial feature of the above-mentioned target object may be extracted from image data containing the target object, and the image data may also be a video frame image. The static facial feature data can be extracted by a pre-trained facial feature extraction model, and the facial feature extraction model can be specifically composed of a convolutional neural network, a residual network, or the like. The static facial feature may characterize an appearance feature, action and posture features, an expression feature, or the like, of the target object, and may be understood as a mixed feature. If the model is trained only based on the static facial feature, it is difficult for the model to learn only the expression feature therein, but the model may also learn the appearance feature of the target object, such that the model is influenced by the appearance feature of the target object when analyzing an expression: the model may also learn the action and posture features of the target object, such that the model is influenced by an action and a posture of the target object when analyzing the expression, thereby reducing expression analysis accuracy of the model.

Based on this, in addition to the static facial feature, the present embodiment further extracts the dynamic feature which is a feature which can reflect the emotion of the target object to a certain extent, such that the static facial feature is assisted by the dynamic feature, the model can learn a key feature characterizing the emotion in the training process, and then, the key feature can be extracted by the model in an application process, thereby improving the accuracy of the emotion analysis result of the model. In some examples, specific types of the dynamic feature may be determined according to actual requirements.

In the above, the expression change feature above can be obtained from video data, and in the video data, for the same target object, when the expression changes, a shape of the face, and shapes and positions of five sense organs of the face, etc. all change, and the expression change feature characterizing the change of the expression of the target object in video frames can be extracted from the video data. The sound feature can be extracted from audio data, and under different emotions, the sound features emitted by the same target object may be different. For example, under a calm emotion, the sound is soft, under a pleasantly surprised emotion, the sound is possibly sharp, and under an anger emotion, the sound is possibly deep, and therefore, the sound feature contains feature information characterizing the emotion. In some embodiments, the sound feature may include frequency feature, tone feature, pitch feature, energy features, or the like. In some embodiments, the language content feature above may be extracted from audio data, subtitle data, or a text typed and output by the target object. The speaking contents under different emotions can be different for the same target object. For example, under a happy emotion, the speaking content tends to be positive and sunny, and under a sad emotion, the speaking content tends to be depressed and dark. Therefore, the language content feature also contains feature information characterizing the emotion.

Step S104: inputting the static facial feature and the dynamic feature into a pre-trained object emotion analysis model, and fusing the static facial feature and the dynamic feature by the object emotion analysis model to obtain a fusion feature; and outputting an emotion analysis result of the target object based on the fusion feature.

Considering that both the static facial feature and the dynamic feature include features characterizing the emotion, in the present embodiment, by fusing the static facial feature and the dynamic feature though the object emotion analysis model, the feature information characterizing the emotion in the static facial feature and the feature information characterizing the emotion in the dynamic feature are superimposed through the feature fusion operation, such that the features characterizing the emotion are further enhanced, thereby improving the accuracy of the emotion analysis result.

In practical, the object emotion analysis model above can be implemented by combining various network models, such as an attention network, a multilayer perceptron network, a feature superposition network, a feature fusion network, a time sequence network, or the like. In the training process of the object emotion analysis model, fusing is performed on the static facial feature and the dynamic feature of a sample object in training samples to strengthen the feature information characterizing the emotion in the static facial feature and the dynamic feature, such that the model learns key feature information characterizing the emotion, and the emotion analysis result output by the model has high accuracy.

In the object emotion analysis method above, the multimedia data associated with the target object is acquired, and the static facial feature and the dynamic feature of the target object are extracted from the multimedia data, where the dynamic feature includes one or more of the expression change feature, the sound feature and the language content feature of the target object: the static facial feature and the dynamic feature are input into the pre-trained object emotion analysis model, and fusing is performed on the static facial feature and the dynamic feature by the object emotion analysis model to obtain the fusion feature; and the emotion analysis result of the target object is output based on the fusion feature. In this manner, fusing is performed on the static facial feature and the dynamic feature of the target object by the object emotion analysis model to output the emotion analysis result of the target object, and since the dynamic feature also contains the feature information characterizing the emotion, when the emotion analysis is performed by combining the static facial feature and the dynamic feature, the influence of interference features in the static facial feature on the emotion analysis result can be reduced to a certain extent, and a role of the feature information characterizing the emotion is strengthened, thereby improving the accuracy of the emotion analysis result.

An extraction manner of the static facial feature and each dynamic feature is further explained in the following embodiments.

First, the afore-mentioned static facial feature may be extracted using a pre-trained static feature extractor, and in some embodiments, a structure of the static feature extractor may be an Inception-ResNet structure, and certainly, may also be another residual network structure or a convolutional neural network structure.

If the afore-mentioned dynamic feature includes the expression change feature, a specified video frame sequence is acquired from the video data in the multimedia data, where in the video frame sequence, the expression of the target object dynamically changes; and the expression change feature of the target object is extracted from the video frame sequence by the pre-trained expression feature extraction model.

The video frame sequence above may be a continuous video frame segment in the video data. For example, for a laughter expression, the video frame sequence records a series of actions of the target object, including mouth opening, mouth expanding, face deformation, eye deformation, mouth shrinking and mouth closing, and the video frame sequence may include 50 frames, for example. In the video frame sequence, the expression of the target object in each of the frames is slightly changed, and the dynamic change of the expression of the target object can be seen in the continuous video frames. In some embodiments, the expression feature extraction model may be an expression encoding model or other type of feature extraction model. The expression feature extraction model can compress initial high-dimensional information extracted from the video frame sequence into a low-dimensional manifold space, and in the manifold space, similarity features of the expressions have retentivity: that is, in the manifold space, if a space distance between two feature points is small, actual expressions corresponding to the two feature points are also similar. The expression feature extraction model is usually pre-trained with a large-scale facial expression data set as a training sample, such that fine-grained expression features can be labeled. Since the training sample has a large data volume, it can contain the expressions of various objects under various actions and postures, and the expression feature extraction model can learn expression features irrelevant to the appearance, the action and the posture of the object. If the dynamic feature includes the expression change feature, a good prior effect is achieved on subsequent emotion analysis.

If the afore-mentioned dynamic feature includes the sound feature, a specified audio sequence is acquired from the audio data in the multimedia data, where the audio sequence includes a sound signal emitted by the target object: the sound feature of the target object is extracted from the audio sequence by a pre-trained sound feature extraction model, where the sound feature includes one or more of a frequency feature, a tone feature, a pitch feature, and an energy feature.

The sound signal above may be a sound signal recorded when the target object speaks, sings or makes a sound without semantics, and the audio sequence above is obtained by recording the sound signal. In some examples, an audio corresponding to the video frame sequence from which the expression change feature is extracted can be used as the audio sequence. The sound feature extraction model above may be implemented by an open-source voice library librosa, or the sound feature extraction model may be implemented by other network structure or equation. In some embodiments, the frequency feature in the sound feature above may be a Mel frequency cepstrum coefficient (MFCC) feature. The frequency feature may also be a frequency feature in a Fourier frequency domain, a Laplace frequency domain, or the like. In some embodiments, the energy feature may be a short-time energy feature, such as a short-time energy average amplitude, a short-time zero-crossing rate, and other feature parameters. Since the sound feature belongs to features of a comparative bottom layer and have high generalization, and the sound feature extraction model is not required to be trained on a data set and is not easily influenced by data distribution in the data set, the sound feature does not carry personalized feature information characterizing identity information, and a proportion of the feature information characterizing the emotion in the sound feature is large.

If the afore-mentioned dynamic feature includes the language content feature, a language content text of the target object is acquired from the subtitle data and/or audio data in the multimedia data; and the language content feature of the target object is extracted from the language content text by a pre-trained language content feature extraction model, where the language content feature is used to characterize a linguistic meaning of a language uttered by the target object.

The subtitle data is usually in a text format and records words spoken by the target object, such that the language content text of the target object can be directly obtained from the subtitle data. For the audio data, the words spoken by the target object in the audio data can be recognized by a voice recognition tool, so as to obtain the language content text in the text format. In some examples, the language content text of the target object may be extracted from the subtitle data or audio data corresponding to the video frame sequence from which the expression change feature is extracted. In one example, the language content text is “Oh, my god”, and the language content text typically contains a feature characterizing a surprised emotion.

The language content feature extraction model is mainly configured to identify the semantic feature of the language content text above, and can be implemented by a text feature model bidirectional encoder representation from transformers (BERT) or by other text semantic feature extraction models. The language content feature extraction model can be trained using a corpus with a large data volume and can extract the feature between text words of adjacent texts. Since the semantic feature is extracted by the language content feature extraction model and characterize the language meaning of the language emitted by the target object, the language content feature does not carry the personalized feature information characterizing the identity information, and the proportion of the feature information characterizing the emotion in the language content feature is large.

When the target object is a human, the emotion of the target object can be perceived through vision, hearing, and a text. Based on this, in the above-mentioned embodiments, the feature data of the three modalities of the vision, the hearing, and the text is extracted. Considering that the static facial feature contains the personalized information characterizing the identity of the object in a large proportion, the model can be over-fitted to the personalized information when the model is trained using only the static facial feature, the over-fitting problem can be alleviated by adding the multi-modality dynamic feature, and the model is prevented from learning the personalized information, and concentrated on learning emotion-related features, thereby improving the emotion analysis accuracy of the model.

The following embodiments continue to describe a model structure of the object emotion analysis model as well as a specific manner of feature fusion.

The object emotion analysis model includes at least one dynamic feature processing module, and the dynamic feature processing module is configured to input the dynamic feature of a corresponding type, where if the dynamic feature includes three kinds of dynamic feature, i.e., the expression change feature, the sound feature and the language content feature, the object emotion analysis model includes three parallel dynamic feature processing modules, and each dynamic feature processing module is configured to process one kind of dynamic feature. Module parameters of the plurality of dynamic feature processing modules may be the same or different, but generally, structures of the plurality of dynamic feature processing modules are the same.

For each dynamic feature processing module, the dynamic feature corresponding to the dynamic feature processing module and the static facial feature of the target object are input into the dynamic feature processing module; and fusing is performed on the static facial feature and the dynamic feature by the attention network in the dynamic feature extraction module to obtain the fusion feature, where the fusion feature includes the common key feature for characterizing the emotion, between the static facial feature and the dynamic feature.

For example, if the dynamic feature processing model corresponds to the expression change feature, only the expression change feature and the static facial feature of the target object are input, and no other dynamic feature is input. The dynamic feature processing model includes the attention network, and the attention network has a role of reinforcing local features, such that the common key feature for characterizing the emotion in the static facial feature and the dynamic feature can be identified through the attention network, and then the common key feature is strengthened in the feature fusion process, and the emotion analysis accuracy may be improved when emotion analysis is performed based on the feature.

In practical, the dynamic feature is required to be preprocessed before input into the dynamic feature processing model. In some examples, the dynamic feature is input into a time sequence model, and the context feature of the dynamic feature is output, where the context feature is used for characterizing a variation trend of the dynamic feature with time; and time sequence information is added into the context feature, and the context feature in which the time sequence information is added is determined as the dynamic feature to be input into the dynamic feature extraction module, where the time sequence information is used for indicating time sequence positions of features in the context features.

In some embodiments, the time sequence model above may be implemented by a plurality of models, such as a gated recurrent unit (GRU), a recurrent neural network (RNN), a long short-term memory (LSTM), or the like. After the dynamic feature is processed by the time sequence model, the context feature is output, and the feature is characterized by a time parameter, in the context features: the dynamic feature generally includes a series of features, and after processing by the time sequence model, a time sequence association relationship between the features in the dynamic feature can be obtained, such that the context feature is used for characterizing the variation trend of the feature in the dynamic feature with the time. Further, the time sequence information is added in the context feature, and the time sequence information further indicates a time sequence position relationship of the features in the context feature.

In order to further improve the feature fusion effect, in some examples, the attention network in the dynamic feature processing module includes a self-attention network and a cross-attention network, where in some embodiments, the self-attention network may have a network structure of a multi-head attention network, and the cross-attention network may also have a network structure of a multi-head attention network.

Firstly, the dynamic feature is transformed to obtain a first input parameter of the self-attention network, the first input parameter is input into the self-attention network, and an intermediate feature of the dynamic feature is output, where the intermediate feature is used for characterizing autocorrelation of the dynamic feature; a second input parameter of the cross-attention network is determined based on the intermediate feature, a third input parameter of the cross-attention network is determined based on the static facial feature, the second input parameter and the third input parameter are input to the cross-attention network to obtain an output result, and the fusion feature is determined based on the output result.

In some examples, for the attention network, three input parameters are typically required, including a K value, a V value, and a Q value: the K value, the V value, and the Q value can be obtained by transforming the dynamic feature; and the K value, the V value, and the Q value may be the same or different. When the K value, the V value and the Q value are different, the dynamic feature may be transformed in different transformation modes. For example, the dynamic feature may be transformed using a first transformation mode to obtain the K value, the first transformation mode may specifically be convolution transformation, mapping transformation, or the like, and parameter(s) used in the transformation mode may be preset: the dynamic feature may be transformed using a second transformation mode to obtain the V value, the second transformation mode may specifically be convolution transformation, mapping transformation, or the like, and parameter(s) used in the transformation mode may be preset: the dynamic feature may be transformed using a third transformation mode to obtain the Q value, the third transformation mode may specifically be convolution transformation, mapping transformation, or the like, and parameter(s) used in the transformation mode may be preset. The first transformation mode, the second transformation mode and the third transformation mode above may be the same or different, where when the transformation modes are same, the same or different transformation parameters may be used. It should be noted that three input parameters in the first input parameter of the self-attention network are obtained by changing the dynamic feature, and therefore, the three input parameters may be understood as expressions of different levels or different dimensions, of the dynamic feature.

The self-attention network is mainly configured to calculate a global self-attention result for one kind of dynamic feature, the first input parameter is obtained by transforming the dynamic feature, the self-attention network performs calculation on the first input parameter to output the intermediate feature, and the intermediate feature characterizes the autocorrelation of the dynamic feature. In one manner, the first input parameter includes the K value, the V value, and the Q value, where the K, V and Q are all in a matrix form, and the self-attention network performs the following calculation on the K value, the V value, and the Q value of the first input parameter:

$$A = K^T Q;$$

$$A' = \text{softmax}\ (A);$$

$$O = VA';$$

where $K^T$ is a transposed matrix of K; softmax represents a normalized exponential function; and O represents the intermediate feature of the dynamic feature output from the self-attention network.

Unlike the self-attention network, some parameters of the cross-attention network are determined based on the intermediate feature output from the self-attention network: that is, these parameters are related to the dynamic feature; and the other parameters of the cross-attention network are determined based on the static facial feature, that is, these parameters are related to the static facial feature, and since the input parameters are related to both the dynamic feature and the static facial feature, the dynamic feature and the static facial feature may be fused by the cross-attention network to obtain the fusion feature.

In some examples, first fusion processing is performed on the intermediate feature and the dynamic feature to obtain a first fusion result; and the first fusion result is transformed to obtain the second input parameter of the cross-attention network. In some embodiments, the first fusion processing may include performing feature addition on the intermediate feature and the dynamic feature to obtain an addition result, and then performing normalization processing on the addition result to obtain a first fusion result. In some embodiments, the feature addition may be feature splicing, or addition of feature data located at same position points, or the like. In some embodiments, when the first fusion result is transformed, the transformation mode may be convolution transformation, mapping transformation, or the like, and parameters used in the transformation mode may be preset.

In addition, the static facial feature is transformed to obtain the third input parameter of the cross-attention network. In some embodiments, when the static facial feature is transformed, the transformation mode may be convolution transformation, mapping transformation, or the like, and parameters used in the transformation mode may be preset.

As an example, the second input parameter above includes the K value and the V value of the cross-attention network, and the third input parameter includes the Q value of the cross-attention network: the K value and the V value may be the same or different. The cross-attention network is configured to calculate a cross-attention result of the static facial feature and the dynamic feature. In one manner, an attention coefficient of the cross-attention network is calculated as follows:

$$\text{Attention}\ (Q, K, V) = \text{Attention}\ \left(h'_{()}, h_s, h_s\right) = \text{softmax}\left(\frac{h'_{()} h_s^T}{\sqrt{d_k}}\right) h_s$$

where Attention represents the attention coefficient of the cross-attention network:

$$h'_{()}$$

indicates the above intermediate feature output by the self-attention network: $h_s$ indicates the static facial feature;

$$h_s^T$$

is a transposed matrix of $h_s$; and $d_k$ is a dimension of $h_s$.

Further, the output result of the cross-attention network is further required to be processed as follows to obtain the fusion feature: performing second fusion processing on the output result and the first fusion result corresponding to the second input parameter to obtain a second fusion result, where the second input parameter is obtained by transforming the first fusion result; inputting the second fusion result into a preset first multilayer perceptron, and performing mapping on the second fusion result by the first multilayer perceptron to obtain a mapping result; and performing third fusion processing on the mapping result and the second fusion result to obtain the fusion feature.

In some embodiments, the first fusion result above is the first fusion result after performing the first fusion processing on the intermediate feature output from the self-attention network and the dynamic feature. In some embodiments, the second fusion processing may include performing feature addition on the output result and the first fusion result to obtain an addition result, and then performing normalization processing on the addition result to obtain the second fusion result. In some embodiments, the feature addition may be feature splicing, or addition of feature data located at same position points, or the like. In some embodiments, the third fusion processing above may include performing feature addition on the mapping result and the second fusion result to obtain an addition result, and then performing normalization processing on the addition result to obtain the fusion feature. In some embodiments, the feature addition may be feature splicing, or addition of feature data located at same position points, or the like. The first multilayer perceptron above may be implemented by a multilayer perceptron (MLP) network.

Figure 2:
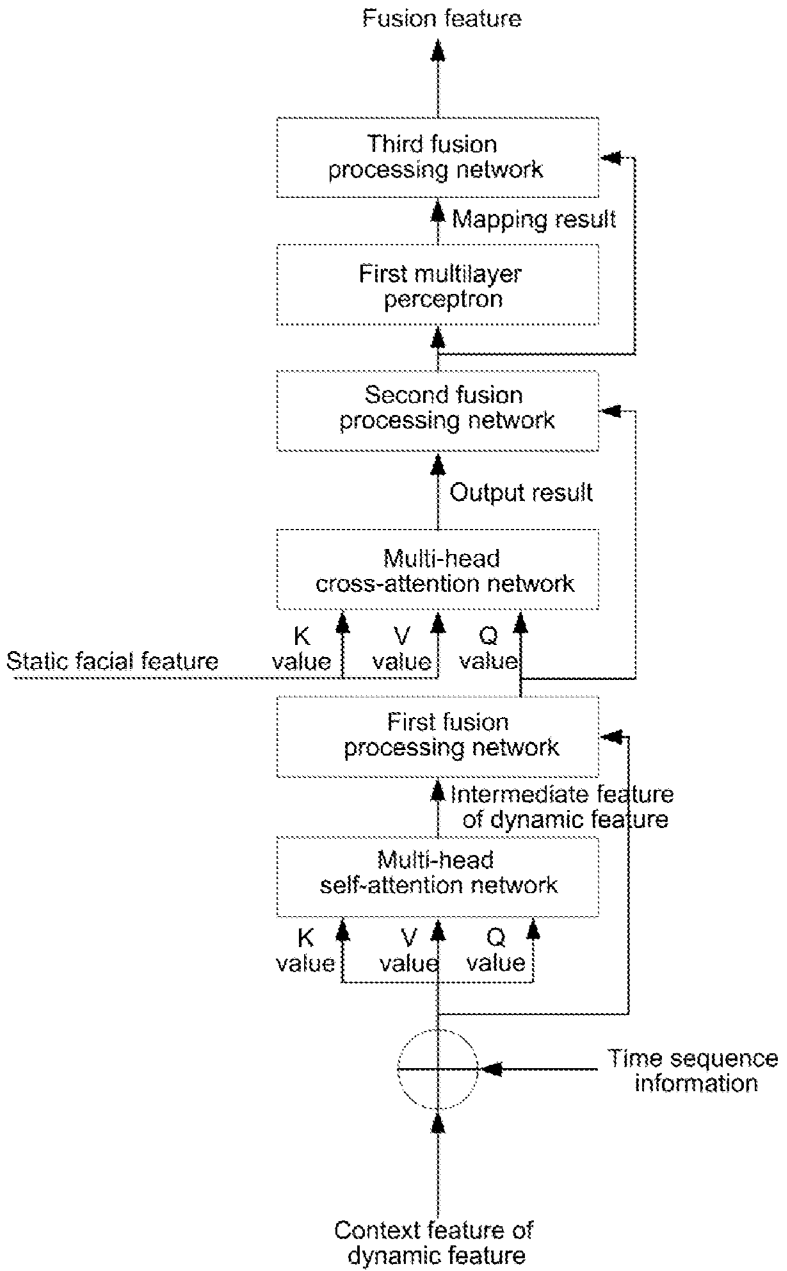
FIG. 2 is a schematic diagram of a module structure and a data flow direction of a dynamic feature processing module provided in one or more embodiments of the present disclosure.

FIG. 2 shows a module structure and a data flow direction of the dynamic feature processing module. In this example, the self-attention network is implemented by a multi-head self-attention network, and the cross-attention network is implemented by a multi-head cross-attention network. A first fusion processing network is configured to execute the first fusion processing in the foregoing embodiments, a second fusion processing network is configured to execute the second fusion processing in the foregoing embodiments, and a third fusion processing network is configured to execute the third fusion processing in the foregoing embodiments. The first fusion processing network, the second fusion processing network and the third fusion processing network may all be implemented by an Add & Norm network, such that the addition and normalization processing of the input feature are realized.

When the dynamic feature includes multiple kinds of dynamic features, each kind of dynamic feature can be processed by the corresponding dynamic feature processing module to obtain the fusion feature corresponding to the dynamic feature. When the dynamic feature includes multiple kinds of dynamic features, the afore-mentioned object emotion analysis model includes a plurality of dynamic feature processing modules, and the dynamic feature processing modules are each configured to input the dynamic feature of a corresponding type and output the fusion feature corresponding to the dynamic feature: the fusion features output by the dynamic feature processing modules and the static face feature are spliced to obtain spliced features; and the spliced features are input into a preset second multilayer perceptron to output the emotion analysis result of the target object. The spliced features each include the fusion feature and the static facial feature, and a dimension quantity of a specified dimension of the spliced features is generally equal to a sum of dimension quantities of specified dimensions of the fusion features and the static facial feature. The second multilayer perceptron may be implemented by an MLP network.

Further, in order to make the emotion analysis result more accurate and reasonable, in the present embodiment, the object emotion analysis model outputs analysis results of a plurality of emotion analysis modes. Based on this, the second multilayer perceptron above includes a plurality of branch networks; and in the training process, each branch network learns a feature mapping mode corresponding to one emotion analysis mode. The spliced features are input into the plurality of branch networks of the second multilayer perceptron respectively, where each of the branch networks is preset with a feature mapping mode corresponding to the branch network; the feature mapping mode includes more of the follows: performing linear combination mapping based on a preset facial action unit, performing linear combination mapping based on plural preset basic emotion types, and performing linear characterization mapping based on a positive-negative degree and an intense degree of the emotion; and the spliced features are mapped by the branch networks according to the feature mapping modes corresponding to the branch networks, so as to obtain the emotion analysis results output by the branch networks.

In the above, in the feature mapping mode of performing linear combination mapping based on the preset facial action unit, expressions of the face are divided into a plurality of action units in advance according to muscle distribution of the face, and when the face expresses the emotion through the expression, the expression is represented by a linear combination of the action units. In some embodiments, after the branch network receives the spliced feature, the feature mapping mode thereof includes calculating a linear weight of each action unit according to the spliced feature, and performing linear combination on the action units using the linear weights, so as to obtain the emotion analysis result.

In the feature mapping mode of performing linear combination mapping based on the plural preset basic emotion types, emotions are divided in advance into plural basic emotions, such as neutrality, happiness, sadness, surprise, fears, anger, aversions, or the like. In some embodiments, after the branch network receives the spliced features, the feature mapping mode thereof includes calculating a linear weight of each basic emotion according to the spliced feature, and performing linear combination on the basic emotions using the linear weights, so as to obtain the emotion analysis result.

In some embodiments, in the feature mapping mode of performing linear characterization mapping based on the positive-negative degree and the intense degree of the emotion, after the branch network receives the spliced features, the feature mapping mode thereof includes calculating a parameter of the positive-negative degree and a parameter of the intense degree according to the spliced features, and characterizing the emotion based on the two parameters, so as to obtain the emotion analysis result.

In practical, the second multilayer perceptron above includes three branch networks which correspond to three feature mapping modes respectively of: performing the linear combination mapping based on the preset facial action unit, performing the linear combination mapping based on the plural preset basic emotion types, and performing the linear characterization mapping based on the positive-negative degree and the intense degree of the emotion, such that the obtained emotion analysis result includes the emotion analysis result obtained according to each of the feature mapping modes.

Figure 3:
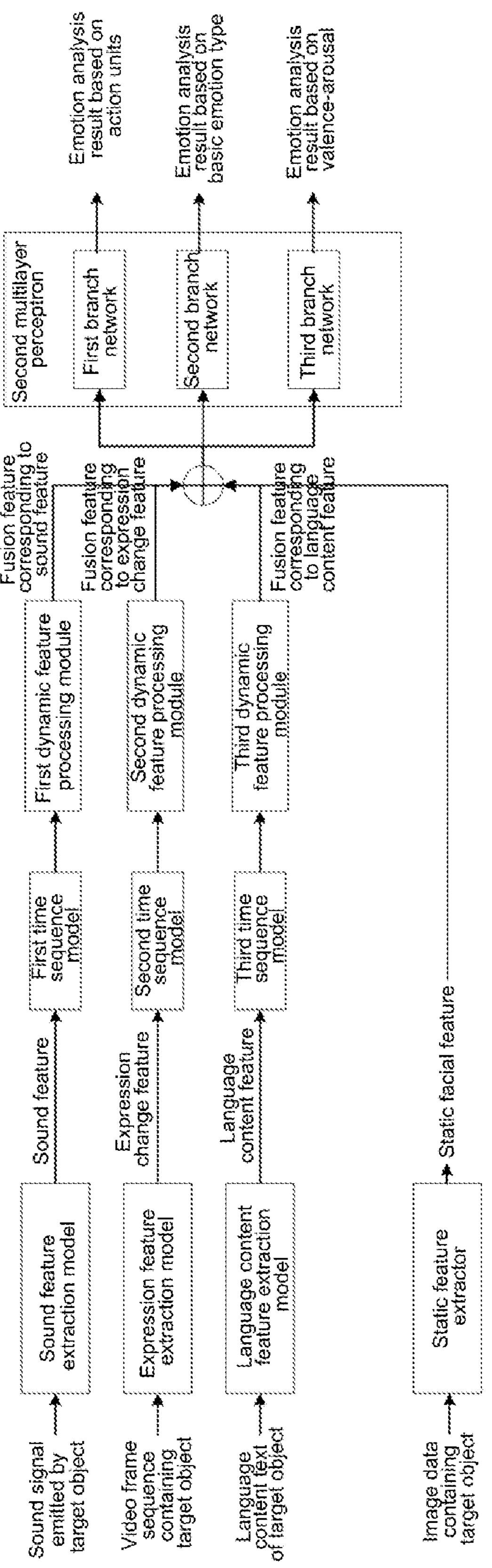
FIG. 3 is a schematic diagram of a model structure and a data flow direction of an object emotion analysis model provided in one or more embodiments of the present disclosure.

FIG. 3 shows a module structure and a data flow direction of the object emotion analysis model. In this example, the object emotion analysis model includes a plurality of dynamic feature processing modules and a second multilayer perceptron. In the above, the sound feature is processed by a first time sequence model and then input to a first dynamic feature processing module, so as to obtain the fusion feature corresponding to the sound feature: the expression change feature is processed by a second time sequence model and then input to a second dynamic feature processing module, so as to obtain the fusion feature corresponding to the expression change feature; and the language content feature is processed by a third time sequence model and then input to a third dynamic feature processing module, so as to obtain the fusion feature corresponding to the language content feature. After spliced, the three fusion features and the static facial feature are input into the second multilayer perceptron, where the feature mapping mode of performing linear combination mapping based on the facial action unit is adopted in a first branch network to obtain the emotion analysis result based on the action units: the feature mapping mode of performing linear combination mapping based on the plural basic emotion types is adopted in a second branch network to obtain the emotion analysis result based on the basic emotion types; and the feature mapping mode of performing linear characterization mapping based on the positive-negative degree and the intense degree of the emotion is adopted in a third branch network to obtain the emotion analysis result based on the valence-arousal.

In some examples, the object emotion analysis method described according to the foregoing embodiments may be used to analyze the emotion of the target object in each video frame in video data, so as to obtain the emotion change of the target object in the video data.

In some examples, the multimedia data above is video data with video pictures containing the target object: the video frames in the video data are each taken as a current video frame one by one, and the following operations are performed on the current video frame: acquiring the static facial feature from the current video frame; acquiring the expression change feature from the video frame sequence containing the current video frame: acquiring the sound feature from the audio data corresponding to the video frame sequence: acquiring the language content feature from the audio data and/or subtitle data corresponding to the video frame sequence; and obtaining the emotion analysis result of the target object in the current video frame using the object emotion analysis method described in the above-mentioned embodiments.

For example, the afore-mentioned video data includes N video frames, and emotion analysis result i can be obtained for video frame i among them: the emotion analysis results of the video frames are arranged according to an arrangement sequence of the video frames to obtain emotion analysis result 1, emotion analysis result 2, . . . , and emotion analysis result N. In some examples, the emotion analysis result corresponding to the video data may be an arrangement combination of a series of emotions, such as peace, peace, surprise, surprise, surprise, happiness, happiness, happiness, happiness, etc.

In addition, in order to further improve the accuracy of the emotion analysis result, after obtaining the emotion analysis result of the target object in the current video frame, the emotion analysis result corresponding to the video frame in the video data is acquired: it is determined based on the emotion analysis result corresponding to the video frame that there is an emotion sudden-change video frame in the video data, where the emotion analysis result of the emotion sudden-change video frame is a first analysis result, the emotion analysis results of the video frames adjacent to, i.e. before and after the emotion sudden-change video frame are second analysis results, and the first analysis result is different from the second analysis results; and based on the second analysis results, the emotion analysis result of the emotion sudden-change video frame is smoothed to obtain a smoothed emotion analysis result.

It may be understood that the emotion change of a human or other object usually has smoothness, and the situation that the emotion suddenly changes over a short time rarely occurs. For the above emotion sudden-change video frame, it may be understood that the emotion analysis result corresponding to the video frame is different from both the emotion analysis results of the video frames adjacent to, i.e., before and after the video frame. In one example, the emotion analysis result corresponding to the video data is peace, peace, surprise, surprise, surprise, happiness, anger, happiness, and happiness. At this time, the video frame corresponding to the "anger" is the emotion sudden-change video frame, and since the target object usually does not suddenly have an angry emotion under a happy emotion, it indicates that the emotion analysis result corresponding to the emotion sudden-change video frame may have an error. In order to avoid the error, the emotion analysis result of the emotion sudden-change video frame is smoothed based on the emotion analysis results of the video frames adjacent to, i.e. before and after the emotion sudden-change video frame. Continuing with the above example, the emotion analysis result corresponding to the smoothed video data is peace, peace, surprise, surprise, surprise, happiness, happiness, happiness and happiness.

In this way, an obvious error of the emotion analysis result can be avoided, thereby improving the accuracy and reasonability of the emotion analysis result.

The following embodiments describe a way of training the foregoing object emotion analysis model.

Taking human emotion analysis as an example, the model can be trained on a human face expression data set in a natural environment, and the data set contains a large number of spontaneous emotion expression videos in a real non-experimental environment. Since the object emotion analysis model needs output various emotion analysis results, during the training process, the model needs to be restricted by using a plurality of loss functions.

In some examples, for the emotion analysis result based on the action units, loss value LAU is calculated using the following loss functions:

$$L_{AU} = L_{circle} + L_{CrossEntropy}$$

$$L_{CrossEntropy} = -\frac{1}{N_{AU}}\sum_{j=1}^{N_{AU}}\left[y_j\log\hat{y}_j + (1-y_j)\log(1-\hat{y}_j)\right]$$

-continued $$L_{circle} = \log\left(1 + \sum_{i\in\Omega_0} e^{S_i}\right) + \log\left(1 + \sum_{i\in\Omega_1} e^{-S_i}\right)$$

$$\Omega_0 = \{i \mid \text{if } y_i = 0\}$$

$$\Omega_1 = \{i \mid \text{if } y_j = 1\}$$

where $N_{AU}$ represents the number of the action units (AUs) to be predicted, and $y_j$ represents a label of the jth AU, and has a value of 0 or 1 which indicates whether the AU appears or not. $\hat{y}_j$ represents a prediction probability of the jth AU by the network, and $S_i$ represents a direct output result of the above first branch network; $\hat{y}_i$ is a calculation result of the direct output $S_i$ of the network by a sigmoid layer: if the total number of the action units required to be predicted by the model is N, a total of N labels are output, and for a certain label, the label value of 1 indicates that the action unit corresponding to the label appears, and the label value of 0 indicates that the action unit corresponding to the label does not appear. The model outputs the prediction probability corresponding to each action unit. $\Omega_0$ and $\Omega_1$ are two sets, where $\Omega_0$ represents a set of sequence numbers of AUs with the label value of 0 in the N AUs, $\Omega_1$ represents a set of sequence numbers of AUs with the label value of 1 in the N AUs, and i and j are sequence numbers of the AUs. i represents the ith AU in the $\Omega_0$ set, and $\Omega_0$ is a set of all AUs with y=0; if means if.

$L_{CrossEntropy}$ is a cross entropy loss function. $L_{circle}$ makes the outputs of all the appearing AUs greater than 0 and the outputs of all the non-appearing AUs less than 0, which helps to describe a symbiotic relationship between the AUs.

For the emotion analysis results based on the plural basic emotion types, loss value $L_{EXPR}$ is calculated using a cross entropy loss function of a soft label:

$$L_{EXPR} = \lambda\log(\hat{z}_e) + \sum_{i=1,i\neq e}^{N_{EXPR}} (1-\lambda)\log(\hat{z}_i)$$

where $N_{EXP}$ is a number of the types of the basic emotions, $\hat{z}_i$ is a prediction probability of the ith emotion type, and e is the actual emotion type: $\hat{z}_e$ is a prediction probability of the eth emotion type; and $\lambda$ may be 0.9, which indicates a degree of relaxation of the soft label.

For the emotion analysis result based on the positive-negative degree and the intense degree of the emotion, a loss value $L_{VA}$ is calculated using a concordance correlation coefficient (CCC) loss function:

$$L_{VA} = 2 - \left[CCC(V, \hat{V}) + CCC(A, \hat{A})\right]$$

where V represents a label of the positive-negative degree, and $\hat{V}$ represents the positive-negative degree actually output by the third branch network: A represents a label of the intense degree, and $\hat{A}$ represents the intense degree actually output by the third branch network.

A final loss function of the object emotion analysis model is:

$$L = \alpha_{AU}L_{AU} + \alpha_{EXPR}L_{EXPR} + \alpha_{VA}L_{VA}$$

where $\alpha_{AU}$ has a value of 0 or 1 and is used for indicating whether the training sample has a label of the facial action unit: $\alpha_{EXPR}$ has a value of 0 or 1 and is used for indicating whether the training sample has a label of the basic emotion type; and ara has a value of 0 or 1 and is used for indicating whether the training sample has labels of the positive-negative degree and the intense degree of the emotion. During the training process, it is possible that some training samples have only partial labels, and in this case, other known labels may be used to make up for the information about unknown labels.

Under supervision of various loss functions, the network is optimized by training of an optimizer: after the loss value L converges, model training is ended, and at this time, the network parameters in the model may be fixed. The object emotion analysis model which can accurately analyze the emotion and has good generalization can be obtained, and the emotion analysis result can be characterized in various ways.

In the object emotion analysis method according to the present embodiment, considering that main channels of the human perception of the emotion come from various modalities, such as vision, hearing, text, or the like, tasks related to the expressions are closely associated with information of the modalities: the present embodiment proposes that emotion related information is fully mined by utilizing the multi-modality dynamic features to assist a detection task related to the expressions, and the extracted multi-modality dynamic features are irrelevant to personalized information or identity information, which can effectively assist in alleviating the problem of identity over-fitting. Further, in order to better fuse the multi-modality features of the emotion, it is proposed to utilize the multi-head attention mechanism to fuse the features, such that the extracted features are more beneficial to improving effects of downstream tasks. In addition, considering a situation that the basic emotion label changes suddenly is rare in a continuous frame segment, the present embodiment further proposes that the prediction result is further smoothed by using a filtering strategy to remove some wrong prediction situations and further improve the accuracy and reasonability of emotion analysis.

Figure 4:
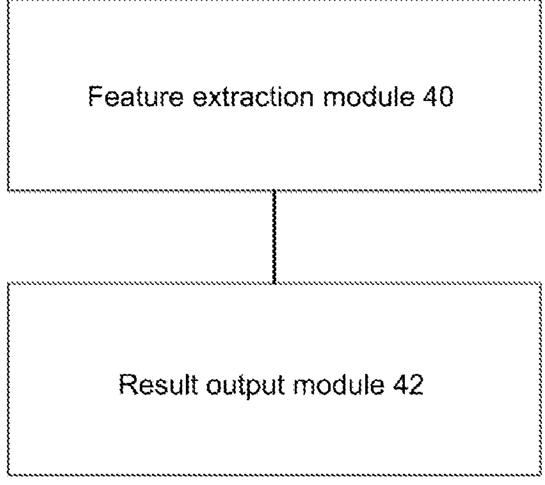
FIG. 4 is a schematic structural diagram of an object emotion analysis apparatus provided in one or more embodiments of the present disclosure.

Corresponding to the above-mentioned method embodiment, referring to the schematic structural diagram of an object emotion analysis apparatus shown in FIG. 4, the apparatus includes:

- a feature extraction module 40 configured to acquire multimedia data associated with a target object, and extract a static facial feature and a dynamic feature of the target object from the multimedia data, where the dynamic feature includes one or more of an expression change feature, a sound feature and a language content feature of the target object; and
- a result output module 42 configured to input the static facial feature and the dynamic feature into a pre-trained object emotion analysis model, fuse the static facial feature and the dynamic feature by the object emotion analysis model to obtain a fusion feature, and output an emotion analysis result of the target object based on the fusion feature.

The object emotion analysis apparatus above acquires the multimedia data associated with the target object, and extracts the static facial feature and the dynamic feature of the target object from the multimedia data, where the dynamic feature includes one or more of the expression change feature, the sound feature and the language content feature of the target object: inputs the static facial feature and the dynamic feature into the pre-trained object emotion analysis model, and fuses the static facial feature and the dynamic feature by the object emotion analysis model to obtain the fusion feature; and outputs the emotion analysis result of the target object based on the fusion feature. In this manner, fusing is performed on the static facial feature and the dynamic feature of the target object by the object emotion analysis model to output the emotion analysis result of the target object, and since the dynamic feature also contains feature information characterizing an emotion, when the emotion analysis is performed by combining the static facial feature with the dynamic feature, the influence of interference features in the static facial feature on the emotion analysis result may be reduced to a certain extent, and the role of the feature information characterizing the emotion is strengthened, thereby improving accuracy of the emotion analysis result.

The feature extraction module is further configured to: acquire a specified video frame sequence from video data in the multimedia data if the dynamic feature includes the expression change feature, where an expression of the target object dynamically changes in the video frame sequence; and extract the expression change feature of the target object from the video frame sequence by a pre-trained expression feature extraction model.

The feature extraction module is further configured to: acquire a specified audio sequence from audio data in the multimedia data if the dynamic feature includes the sound feature, where the audio sequence includes a sound signal emitted by the target object; and extract the sound feature of the target object from the audio sequence by a pre-trained sound feature extraction model, where the sound feature includes one or more of a frequency feature, a tone feature, a pitch feature, and an energy feature.

The feature extraction module is further configured to: acquire a language content text of the target object from subtitle data and/or audio data in the multimedia data if the dynamic feature includes the language content feature; and extract the language content feature of the target object from the language content text by a pre-trained language content feature extraction model, where the language content feature is used to characterize a linguistic meaning of a language uttered by the target object.

The object emotion analysis model above includes at least one dynamic feature processing module, and the dynamic feature processing module is configured to input the dynamic feature of a corresponding type; and the result output module is further configured to: input, for each dynamic feature processing module, the dynamic feature corresponding to the dynamic feature processing module and the static facial feature of the target object into the dynamic feature processing module; and fuse the static facial feature and the dynamic feature by an attention network in the dynamic feature extraction module to obtain the fusion feature, where the fusion feature includes a common key feature for characterizing the emotion, between the static facial feature and the dynamic feature.

The above-mentioned apparatus further includes a time sequence processing module configured to: input the dynamic feature into a time sequence model, and output a context feature of the dynamic feature, where the context feature is used for characterizing a variation trend of the dynamic feature with time; and add time sequence information into the context feature, and determine the context feature in which the time sequence information is added, as the dynamic feature to be input into the dynamic feature extraction module, where the time sequence information is used for indicating time sequence positions of features in the context feature.

The attention network in the dynamic feature processing module includes a self-attention network and a cross-attention network; and the result output module is further configured to: transform the dynamic feature to obtain a first input parameter of the self-attention network, input the first input parameter into the self-attention network, and output an intermediate feature of the dynamic feature, where the intermediate features is used for characterizing autocorrelation of the dynamic feature; and determine a second input parameter of the cross-attention network based on the intermediate feature, determine a third input parameter of the cross-attention network based on the static facial feature, input the second input parameter and the third input parameter to the cross-attention network to obtain an output result, and determine the fusion feature based on the output result.

The result output module is further configured to: perform first fusion processing on the intermediate feature and the dynamic feature to obtain a first fusion result; and transform the first fusion result to obtain the second input parameter of the cross-attention network.

The result output module is further configured to: transform the static facial feature to obtain the third input parameter of the cross-attention network.

The result output module is further configured to: perform second fusion processing on the output result and the first fusion result corresponding to the second input parameter to obtain a second fusion result, where the second input parameter is obtained by transforming the first fusion result: input the second fusion result into a preset first multilayer perceptron, and performing mapping on the second fusion result by the first multilayer perceptron to obtain a mapping result; and perform third fusion processing on the mapping result and the second fusion result to obtain the fusion feature.

The object emotion analysis model above includes a plurality of dynamic feature processing modules, and the dynamic feature processing modules are each configured to input the dynamic feature of a corresponding type and output the fusion feature corresponding to the dynamic feature; and the result output module above is further configured to: splice the fusion features output by the dynamic feature processing modules and the static face feature to obtain spliced features; and input the spliced features into a preset second multilayer perceptron to output the emotion analysis result of the target object.

The second multilayer perceptron above includes a plurality of branch networks; and the result output module is further configured to: input the spliced features into the plurality of branch networks of the second multilayer perceptron respectively, where each of the branch networks is preset with a feature mapping mode corresponding to the branch network, and the feature mapping mode includes more of the follows: performing linear combination mapping based on a preset facial action unit, performing linear combination mapping based on a plurality of preset basic emotion types, and performing linear characterization mapping based on a positive-negative degree and an intense degree of the emotion; and map the spliced features by the branch networks according to the feature mapping modes corresponding to the branch networks, so as to obtain the emotion analysis results output by the branch networks.

The multimedia data above is video data with video pictures containing the target object; and the feature extraction module is further configured to: perform the following operations on a current video frame, with each of the video frames in the video data being taken as the current video frame one by one: acquiring the static facial feature from the current video frame: acquiring the expression change feature from the video frame sequence containing the current video frame: acquiring the sound feature from the audio data corresponding to the video frame sequence; and acquiring the language content feature from the audio data and/or subtitle data corresponding to the video frame sequence.

The above-mentioned apparatus further includes: a smoothing module configured to: acquire the emotion analysis result corresponding to the video frame in the video data: determine that there is an emotion sudden-change video frame in the video data, based on the emotion analysis result corresponding to the video frame, where the emotion analysis result of the emotion sudden-change video frame is a first analysis result, the emotion analysis results of the video frames adjacent to, i.e. before and after the emotion sudden-change video frame are both second analysis results, and the first analysis result is different from the second analysis results; and smooth the emotion analysis result of the emotion sudden-change video frame based on the second analysis results to obtain a smoothed emotion analysis result.

The present embodiment further provides an electronic device, including a processor and a memory, where the memory stores machine executable instructions executable by the processor, and the processor executes the machine executable instructions to implement the above-mentioned object emotion analysis method. The electronic device may be embodied as a server, as well as various types of user terminals, such as a notebook computer, a tablet computer, a desktop computer, a set-top box, and a mobile device (for example, a mobile phone, a portable music player, a personal digital assistant, a dedicated messaging device, and a portable gaming device), or a combination of any two or more of these data processing devices.

Figure 5:
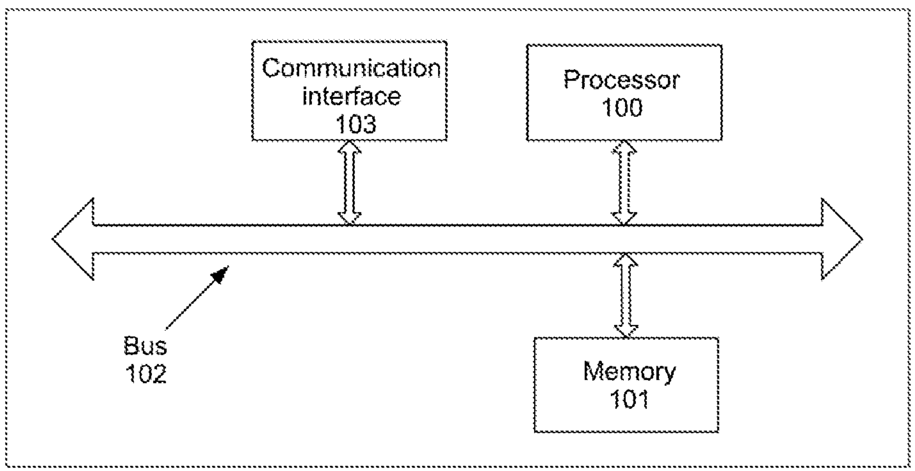
FIG. 5 is a schematic structural diagram of an electronic device provided in one or more embodiments of the present disclosure.

Referring to what is shown in FIG. 5, the electronic device includes a processor 100 and a memory 101, where the memory 101 stores machine executable instructions executable by the processor 100, and the processor 100 executes the machine executable instructions to implement the above-mentioned object emotion analysis method.

Further, the electronic device shown in FIG. 5 further includes a bus 102 and a communication interface 103, and the processor 100, the communication interface 103, and the memory 101 are connected by the bus 102.

In the above, the memory 101 may include a high-speed random access memory (RAM) or may further include a non-volatile memory, such as at least one disk memory. Communication between a system network element and at least one other network element is implemented through the at least one communication interface 103 (which may be wired or wireless), and the Internet, a wide area network, a local area network, a metropolitan area network, or the like, may be used. The bus 102 may be an ISA bus, PCI bus, EISA bus, or the like. The bus may be divided into an address bus, a data bus, a control bus, or the like. For ease of representation, the bus is represented by only one double-headed arrow in FIG. 5, but this does not mean that only one bus or one type of buses exist.

The processor 100 may be an integrated circuit chip having a signal processing capability. In some examples, the steps of the above method may be completed by hardware integrated logic circuits or instructions in the form of software in the processor 100. The processor 100 above may be a general-purpose processor, including a central processing unit (CPU for short), a network processor (NP for short), or the like: may also be a digital signal processor (DSP for short), an application specific integrated circuit (ASIC for short), a field-programmable gate array (FPGA for short) or other programmable logic devices, discrete gate or transistor logic devices, or discrete hardware components. Various methods, steps, and logic blocks in the embodiments of the present disclosure may be implemented or executed. The general-purpose processor may be a microprocessor, or the processor may be any conventional processor, or the like. The steps of the method disclosed in conjunction with the embodiments of the present disclosure may be directly implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, a register, or the like. The storage medium is located in the memory 101, and the processor 100 reads information in the memory 101, and completes the steps of the method according to the foregoing embodiments in combination with hardware thereof.

By executing the machine executable instructions, the processor in the electronic device above may implement the following operations in the object emotion analysis method above: acquiring multimedia data associated with a target object, and extracting a static facial feature and a dynamic feature of the target object from the multimedia data, where the dynamic feature includes one or more of an expression change feature, a sound feature and a language content feature of the target object; inputting the static facial feature and the dynamic feature into a pre-trained object emotion analysis model, and fusing the static facial feature and the dynamic feature by the object emotion analysis model to obtain a fusion feature; and outputting an emotion analysis result of the target object based on the fusion feature.

In this manner, the fusing is performed on the static facial feature and the dynamic feature of the target object by the object emotion analysis model to output the emotion analysis result of the target object, and since the dynamic feature also contains feature information characterizing an emotion, when the emotion analysis is performed by combining the static facial feature with the dynamic feature, an influence of interference features in the static facial features on the emotion analysis result can be reduced to a certain extent, and the role of the feature information characterizing the emotion is strengthened, thereby improving accuracy of the emotion analysis result.

By executing the machine executable instructions, the processor in the electronic device above may implement the following operations in the object emotion analysis method above: acquiring a specified video frame sequence from video data in the multimedia data if the dynamic feature includes the expression change features, where an expression of the target object dynamically changes in the video frame sequence; and extracting the expression change feature of the target object from the video frame sequence by a pre-trained expression feature extraction model.

By executing the machine executable instructions, the processor in the electronic device above may implement the following operations in the object emotion analysis method above: acquiring a specified audio sequence from audio data in the multimedia data if the dynamic feature includes the sound feature, where the audio sequence includes a sound signal emitted by the target object; and extracting the sound feature of the target object from the audio sequence by a pre-trained sound feature extraction model, where the sound feature includes one or more of a frequency feature, a tone feature, a pitch feature, and an energy feature.

By executing the machine executable instructions, the processor in the electronic device above may implement the following operations in the object emotion analysis method above: acquiring a language content text of the target object from subtitle data and/or audio data in the multimedia data if the dynamic feature includes the language content feature; and extracting the language content feature of the target object from the language content text by a pre-trained language content feature extraction model, where the language content feature is used to characterize a linguistic meaning of a language uttered by the target object.

In the above way, the over-fitting problem can be alleviated by adding the multi-modality dynamic feature, and the model is prevented from learning personalized information, and concentrated on learning emotion-related features, thereby improving emotion analysis accuracy of the model.

By executing the machine executable instructions, the processor in the electronic device above may implement the following operations in the object emotion analysis method above. The object emotion analysis model includes at least one dynamic feature processing module, and the dynamic feature processing module is configured to input the dynamic feature of a corresponding type, and the operations include: inputting, for each dynamic feature processing module, the dynamic feature corresponding to the dynamic feature processing module and the static facial feature of the target object into the dynamic feature processing module; and fusing the static facial feature and the dynamic feature by an attention network in the dynamic feature extraction module to obtain the fusion feature, where the fusion feature includes a common key feature for characterizing the emotion, between the static facial feature and the dynamic feature.

By executing the machine executable instructions, the processor in the electronic device above may implement the following operations in the object emotion analysis method above: inputting the dynamic feature into a time sequence model, and outputting a context feature of the dynamic feature, where the context feature is used for characterizing a variation trend of the dynamic feature with time; and adding time sequence information into the context feature, and determining the context feature in which the time sequence information is added, as the dynamic feature to be input into the dynamic feature extraction module, where the time sequence information is used for indicating time sequence positions of features in the context features.

By executing the machine executable instructions, the processor in the electronic device above may implement the following operations in the object emotion analysis method above. The attention network in the dynamic feature processing module includes a self-attention network and a cross-attention network, and the operations include: transforming the dynamic feature to obtain a first input parameter of the self-attention network, inputting the first input parameter into the self-attention network, and outputting the intermediate feature of the dynamic feature, where the intermediate feature is used for characterizing autocorrelation of the dynamic feature; and determining a second input parameter of the cross-attention network based on the intermediate feature, determining a third input parameter of the cross-attention network based on the static facial feature, inputting the second input parameter and the third input parameter to the cross-attention network to obtain an output result, and determining the fusion feature based on the output result.

By executing the machine executable instructions, the processor in the electronic device above may implement the following operations in the object emotion analysis method above: performing first fusion processing on the intermediate feature and the dynamic feature to obtain a first fusion result; and transforming the first fusion result to obtain the second input parameter of the cross-attention network.

By executing the machine executable instructions, the processor in the electronic device above may implement the following operation in the object emotion analysis method above: transforming the static facial feature to obtain the third input parameter of the cross-attention network.

By executing the machine executable instructions, the processor in the electronic device above may implement the following operations in the object emotion analysis method: performing second fusion processing on the output result and the first fusion result corresponding to the second input parameter to obtain a second fusion result, where the second input parameter is obtained by transforming the first fusion result: inputting the second fusion result into a preset first multilayer perceptron, and performing mapping on the second fusion result by the first multilayer perceptron to obtain a mapping result; and performing third fusion processing on the mapping result and the second fusion result to obtain the fusion feature.

By executing the machine executable instructions, the processor in the electronic device above may implement the following operations in the object emotion analysis method above. The object emotion analysis model includes a plurality of dynamic feature processing modules, and the dynamic feature processing modules are each configured to input the dynamic feature of a corresponding type and output the fusion feature corresponding to the dynamic feature, and the operations include: splicing the fusion features output by the dynamic feature processing modules and the static face feature to obtain spliced features; and inputting the spliced features into a preset second multilayer perceptron to output the emotion analysis result of the target object.

By executing the machine executable instructions, the processor in the electronic device above may implement the following operations in the object emotion analysis method above. The second multilayer perceptron includes a plurality of branch networks, and the operations include: inputting the spliced features into the plurality of branch networks of the second multilayer perceptron respectively, where each of the branch networks is preset with a feature mapping mode corresponding to the branch network, and the feature mapping mode includes more of the follows: performing linear combination mapping based on a preset facial action unit, performing linear combination mapping based on a plurality of preset basic emotion types, and performing linear characterization mapping based on a positive-negative degree and an intense degree of the emotion; and performing mapping on the spliced features by the branch networks according to the feature mapping modes corresponding to the branch networks, so as to obtain the emotion analysis results output by the branch networks.

In this way, the object emotion analysis model outputs analysis results of a plurality of emotion analysis modes, such that the emotion analysis result is more accurate and reasonable.

By executing the machine executable instructions, the processor in the electronic device above may implement the following operations in the object emotion analysis method above. The multimedia data is video data with video pictures containing the target object, and the operations include: performing the following operations on a current video frame, with each of the video frames in the video data being taken as the current video frame one by one: acquiring the static facial feature from the current video frame: acquiring the expression change feature from the video frame sequence containing the current video frame: acquiring the sound feature from the audio data corresponding to the video frame sequence; and acquiring the language content feature from the audio data and/or subtitle data corresponding to the video frame sequence.

By executing the machine executable instructions, the processor in the electronic device above may implement the following operations in the object emotion analysis method above: acquiring the emotion analysis result corresponding to the video frame in the video data: determining that there is an emotion sudden-change video frame in the video data, based on the emotion analysis result corresponding to the video frame, where the emotion analysis result of the emotion sudden-change video frame is a first analysis result, the emotion analysis results of the video frames adjacent to, i.e. before and after the emotion sudden-change video frame are both second analysis results, and the first analysis result is different from the second analysis results; and smoothing the emotion analysis result of the emotion sudden-change video frame based on the second analysis results to obtain a smoothed emotion analysis result.

In this way, an obvious error of the emotion analysis result can be avoided, thereby improving the accuracy and reasonability of the emotion analysis result.

The present embodiment further provides a machine-readable storage medium, where the machine-readable storage medium stores machine executable instructions, and when invoked and executed by a processor, the machine executable instructions cause the processor to implement the above-mentioned object emotion analysis method.

For the machine executable instructions stored in the machine-readable storage medium above, the machine executable instructions may be executed to implement the following operations in the object emotion analysis method above: acquiring multimedia data associated with a target object, and extracting a static facial feature and a dynamic feature of the target object from the multimedia data, where the dynamic feature includes one or more of an expression change feature, a sound feature and a language content feature of the target object: inputting the static facial feature and the dynamic feature into a pre-trained object emotion analysis model, and fusing the static facial feature and the dynamic feature by the object emotion analysis model to obtain a fusion feature; and outputting an emotion analysis result of the target object based on the fusion feature.

In this manner, fusing is performed on the static facial feature and the dynamic feature of the target object by the object emotion analysis model to output the emotion analysis result of the target object, and since the dynamic feature also contains feature information characterizing an emotion, when the emotion analysis is performed by combining the static facial feature with the dynamic feature, an influence of interference features in the static facial features on the emotion analysis result can be reduced to a certain extent, and the role of the feature information characterizing the emotion is strengthened, thereby improving accuracy of the emotion analysis result.

For the machine executable instructions stored in the machine-readable storage medium above, the machine executable instructions may be executed to implement the following operations in the object emotion analysis method above: acquiring a specified video frame sequence from video data in the multimedia data if the dynamic feature includes the expression change feature, where an expression of the target object dynamically changes in the video frame sequence; and extracting the expression change feature of the target object from the video frame sequence by a pre-trained expression feature extraction model.

For the machine executable instructions stored in the machine-readable storage medium above, the machine executable instructions may be executed to implement the following operations in the object emotion analysis method above: acquiring a specified audio sequence from audio data in the multimedia data if the dynamic feature includes the sound feature, where the audio sequence includes a sound signal emitted by the target object; and extracting the sound feature of the target object from the audio sequence by a pre-trained sound feature extraction model, where the sound feature includes one or more of a frequency feature, a tone feature, a pitch feature, and an energy feature.

For the machine executable instructions stored in the machine-readable storage medium above, the machine executable instructions may be executed to implement the following operations in the object emotion analysis method above: acquiring a language content text of the target object from subtitle data and/or audio data in the multimedia data if the dynamic feature includes the language content features; and extracting the language content feature of the target object from the language content text by a pre-trained language content feature extraction model, where the language content feature is used to characterize a linguistic meaning of a language uttered by the target object.

In the above manner, the over-fitting problem can be alleviated by adding the multi-modality dynamic feature, and the model is prevented from learning personalized information, and concentrated on learning emotion-related features, thereby improving emotion analysis accuracy of the model.

For the machine executable instructions stored in the machine-readable storage medium above, the machine executable instructions may be executed to implement the following operations in the object emotion analysis method above. The object emotion analysis model includes at least one dynamic feature processing module, and the dynamic feature processing module is configured to input the dynamic feature of a corresponding type; and the operations include: inputting, for each dynamic feature processing module, the dynamic feature corresponding to the dynamic feature processing module and the static facial feature of the target object into the dynamic feature processing module; and fusing the static facial feature and the dynamic feature by an attention network in the dynamic feature extraction module to obtain the fusion feature, where the fusion feature includes a common key feature for characterizing the emotion, between the static facial feature and the dynamic feature.

For the machine executable instructions stored in the machine-readable storage medium above, the machine executable instructions may be executed to implement the following operations in the object emotion analysis method above: inputting the dynamic feature into a time sequence model, and outputting a context feature of the dynamic feature, where the context feature is used for characterizing a variation trend of the dynamic feature with time; and adding time sequence information into the context feature, and determining the context feature in which the time sequence information is added, as the dynamic feature to be input into the dynamic feature extraction module, where the time sequence information is used for indicating time sequence positions of features in the context feature.

For the machine executable instructions stored in the machine-readable storage medium above, the machine executable instructions may be executed to implement the following operations in the object emotion analysis method above. The attention network in the dynamic feature processing module includes a self-attention network and a cross-attention network; and the operations include: transforming the dynamic feature to obtain a first input parameter of the self-attention network, inputting the first input parameter into the self-attention network, and outputting an intermediate feature of the dynamic feature, where the intermediate feature is used for characterizing autocorrelation of the dynamic feature; and determining a second input parameter of the cross-attention network based on the intermediate feature, determining a third input parameter of the cross-attention network based on the static facial feature, inputting the second input parameter and the third input parameter to the cross-attention network to obtain an output result, and determining the fusion feature based on the output result.

For the machine executable instructions stored in the machine-readable storage medium above, the machine executable instructions may be executed to implement the following operations in the object emotion analysis method above: performing first fusion processing on the intermediate feature and the dynamic feature to obtain a first fusion result; and transforming the first fusion result to obtain the second input parameter of the cross-attention network.

For the machine executable instructions stored in the machine-readable storage medium above, the machine executable instructions may be executed to implement the following operations in the object emotion analysis method above: transforming the static facial feature to obtain the third input parameter of the cross-attention network.

For the machine executable instructions stored in the machine-readable storage medium above, the machine executable instructions may be executed to implement the following operations in the object emotion analysis method above: performing second fusion processing on the output result and the first fusion result corresponding to the second input parameter to obtain a second fusion result, where the second input parameter is obtained by transforming the first fusion result: inputting the second fusion result into a preset first multilayer perceptron, and performing mapping on the second fusion result by the first multilayer perceptron to obtain a mapping result; and performing third fusion processing on the mapping result and the second fusion result to obtain the fusion feature.

For the machine executable instructions stored in the machine-readable storage medium above, the machine executable instructions may be executed to implement the following operations in the object emotion analysis method above. The object emotion analysis model includes a plurality of dynamic feature processing modules, and the dynamic feature processing modules are each configured to input the dynamic feature of a corresponding type and output the fusion feature corresponding to the dynamic feature; and the operations include: splicing the fusion features output by the dynamic feature processing modules and the static face feature to obtain spliced features; and inputting the spliced features into a preset second multilayer perceptron to output the emotion analysis result of the target object.

For the machine executable instructions stored in the machine-readable storage medium above, the machine executable instructions may be executed to implement the following operations in the object emotion analysis method above. The second multilayer perceptron includes a plurality of branch networks; and the operations include: inputting the spliced features into the plurality of branch networks of the second multilayer perceptron respectively, where each of the branch networks is preset with a feature mapping mode corresponding to the branch network, and the feature mapping mode includes more of the follows: performing linear combination mapping based on a preset facial action unit, performing linear combination mapping based on a plurality of preset basic emotion types, and performing linear characterization mapping based on a positive-negative degree and an intense degree of the emotion; and performing mapping on the spliced features by the branch networks according to the feature mapping modes corresponding to the branch networks, so as to obtain the emotion analysis results output by the branch networks.

In this way, the object emotion analysis model outputs analysis results of a plurality of emotion analysis modes, such that the emotion analysis result is more accurate and reasonable.

For the machine executable instructions stored in the machine-readable storage medium above, the machine executable instructions may be executed to implement the following operations in the object emotion analysis method above. The multimedia data is video data with video pictures containing the target object; and the operations includes: performing the following operations on a current video frame, with each of the video frames in the video data taken as the current video frame one by one: acquiring the static facial feature from the current video frame: acquiring the expression change feature from the video frame sequence containing the current video frame; acquiring the sound feature from the audio data corresponding to the video frame sequence; and acquiring the language content feature from the audio data and/or subtitle data corresponding to the video frame sequence.

For the machine executable instructions stored in the machine-readable storage medium above, the machine executable instructions may be executed to implement the following operations in the object emotion analysis method above: acquiring the emotion analysis result corresponding to the video frame in the video data; determining that there is an emotion sudden-change video frame in the video data, based on the emotion analysis result corresponding to the video frame, where the emotion analysis result of the emotion sudden-change video frame is a first analysis result, the emotion analysis results of the video frames adjacent to, i.e. before and after the emotion sudden-change video frame are second analysis results, and the first analysis result is different from the second analysis results; and smoothing the emotion analysis result of the emotion sudden-change video frame based on the second analysis results to obtain a smoothed emotion analysis result.

In this way, an obvious error of the emotion analysis result can be avoided, thereby improving the accuracy and reasonability of the emotion analysis result.

A computer program product of the object emotion analysis method and apparatus and the electronic device provided in the embodiments of the present disclosure includes a computer-readable storage medium storing a program code, where instructions included in the program code may be used to execute the method according to the foregoing method embodiments, and for specific embodiments, reference may be made to the method embodiments, which are not repeated herein.

It may be clearly understood by persons skilled in the art that, for the purpose of convenient and brief description, reference for detailed working processes of the foregoing systems and apparatuses may be made to corresponding processes in the foregoing method embodiments, which are not repeated herein.

In addition, in the description of the embodiments of the present disclosure, unless specified or limited otherwise, the terms "mounted", "connected", and "coupled" and the like should be understood in a broad sense. For example, it may be fixed connection, detachable connection, or integral connection: may be mechanical connection or electrical connection: may be direct connection or indirect connection via an intermediate: or may also be inner communication between two elements. Those of ordinary skill in the art may understand the specific meanings of the above terms in the embodiments of the present application according to specific situations.

When implemented in the form of software functional units and sold or used as independent products, the functions can be stored in a computer-readable storage medium. Based on such an understanding, the technical solutions of the present disclosure essentially, or the part contributing to the prior art, or a part of the technical solutions may be implemented in the form of a software product. The computer software product is stored in a storage medium and includes several instructions for instructing a computer device (which may be a personal computer, a server, or a network device) to perform all or a part of steps of the method described in the embodiments of the present disclosure. Moreover, the above-mentioned storage medium includes various media capable of storing program codes, such as a U disk, a mobile hard disk, a read-only memory (ROM), a random access memory (RAM), a magnetic disk, an optical disk, or the like.

In descriptions of the present disclosure, it should be noted that orientations or positional relationships indicated by terms "center", "upper", "lower", "left", "right", "vertical", "horizontal", "inner", "outer", etc. are based on orientations or positional relationships shown in the drawings, only for convenience of describing the present disclosure and simplifying description, rather than indicating or implying that an indicated apparatus or element must have a specific orientation or be constructed and operated in a specific orientation. Therefore, it cannot be understood as a limitation on the present disclosure. In addition, the terms such as "first", "second" and "third" are only used for purposes of description and are not intended to indicate or imply importance in relativity.

Finally, it should be noted that the above embodiments are only some examples of the present disclosure and used to illustrate the technical solutions of the present disclosure, but not to limit it, and the protection scope of the present disclosure is not limited thereto. Although the present disclosure is described in detail with reference to the above embodiments, those skilled in the art should understand that any person skilled in the art still can modify technical solutions recited in the afore-mentioned embodiments or easily envisage changes or equivalently replace partial technical features therein within the technical scope of the present disclosure. These modifications, changes or substitutions do not make essence of corresponding technical solutions depart from the spirit and scope of the technical solutions of the embodiments of the present disclosure, and should be all covered by the protection scope of the present disclosure. Therefore, the protection scope of the present disclosure shall be subject to the protection scope of the claims.

What is claimed is:

1. An object emotion analysis method, comprising:

acquiring multimedia data associated with a target object, and extracting a static facial feature and a dynamic feature of the target object from the multimedia data, wherein the dynamic feature comprises at least one of an expression change feature, a sound feature or a language content feature of the target object; and inputting the static facial feature and the dynamic feature into an object emotion analysis model, wherein the object emotion analysis model is pre-trained, fusing the static facial feature and the dynamic feature by the object emotion analysis model to obtain a fusion feature, and outputting an emotion analysis result of the target object based on the fusion feature, wherein the object emotion analysis model comprises a dynamic feature processing module, and the dynamic feature processing module is configured to input the dynamic feature of a corresponding type; and wherein fusing the static facial feature and the dynamic feature by the object emotion analysis model to obtain the fusion feature comprises:

inputting, for the dynamic feature processing module, the dynamic feature corresponding to the dynamic feature processing module and the static facial feature of the target object into the dynamic feature processing module; and fusing the static facial feature and the dynamic feature by an attention network in the dynamic feature processing module to obtain the fusion feature, wherein the fusion feature comprises a common key feature for characterizing an emotion, between the static facial feature and the dynamic feature, wherein the method further comprises:

inputting the dynamic feature into a time sequence model, and outputting a context feature of the dynamic feature, wherein the context feature is configured for characterizing a variation trend of the dynamic feature with time; and adding time sequence information into the context feature, and determining the context feature in which the time sequence information is added, as the dynamic feature to be input into the dynamic feature processing module, wherein the time sequence information is configured for indicating time sequence positions of features in the context feature.

2. The method according to claim 1, wherein extracting the dynamic feature of the target object from the multimedia data comprises:

acquiring a specified video frame sequence from video data in the multimedia data in response to determining that the dynamic feature comprises the expression change feature, wherein an expression of the target object dynamically changes in the video frame sequence; and extracting the expression change feature of the target object from the video frame sequence by a pre-trained expression feature extraction model.

3. The method according to claim 1, wherein extracting the dynamic feature of the target object from the multimedia data comprises:

acquiring a specified audio sequence from audio data in the multimedia data in response to determining that the dynamic feature comprises the sound feature, wherein the audio sequence comprises a sound signal emitted by the target object; and extracting the sound feature of the target object from the audio sequence by a pre-trained sound feature extraction model, wherein the sound feature comprises at least one of a frequency feature, a tone feature, a pitch feature, or an energy feature.

4. The method according to claim 1, wherein extracting the dynamic feature of the target object from the multimedia data comprises:

acquiring a language content text of the target object from subtitle data or audio data in the multimedia data in response to determining that the dynamic feature comprises the language content feature; and extracting a language content feature of the target object from the language content text by a pre-trained language content feature extraction model, wherein the language content feature is configured to characterize a linguistic meaning of a language uttered by the target object.

5. The method according to claim 1, wherein the attention network in the dynamic feature processing module comprises a self-attention network and a cross-attention network; and wherein fusing the static facial feature and the dynamic feature by the attention network in the dynamic feature processing module to obtain the fusion feature comprises:

transforming the dynamic feature to obtain a first input parameter of the self-attention network, inputting the first input parameter into the self-attention network, and outputting an intermediate feature of the dynamic feature, wherein the intermediate feature is configured for characterizing autocorrelation of the dynamic feature; and determining a second input parameter of the cross-attention network based on the intermediate feature, determining a third input parameter of the cross-attention network based on the static facial feature, inputting the second input parameter and the third input parameter to the cross-attention network to obtain an output result, and determining the fusion feature based on the output result.

6. The method according to claim 5, wherein determining the second input parameter of the cross-attention network based on the intermediate feature comprises:

performing first fusion processing on the intermediate feature and the dynamic feature to obtain a first fusion result; and transforming the first fusion result to obtain the second input parameter of the cross-attention network.

7. The method according to claim 6, wherein performing first fusion processing on the intermediate feature and the dynamic feature to obtain the first fusion result comprises:

performing feature addition on the intermediate feature and the dynamic feature to obtain an addition result; and performing normalization processing on the addition result to obtain the first fusion result.

8. The method according to claim 7, wherein the feature addition comprises: feature splicing, or addition of feature data located at same position points.

9. The method according to claim 5, wherein determining the third input parameter of the cross-attention network based on the static facial feature comprises:

transforming the static facial feature to obtain the third input parameter of the cross-attention network.

10. The method according to claim 5, wherein determining the fusion feature based on the output result comprises:

performing second fusion processing on the output result and the first fusion result corresponding to the second input parameter to obtain a second fusion result, wherein the second input parameter is obtained by transforming the first fusion result;

inputting the second fusion result into a preset first multilayer perceptron, and performing mapping on the second fusion result by the first multilayer perceptron to obtain a mapping result; and performing third fusion processing on the mapping result and the second fusion result to obtain the fusion feature.

11. The method according to claim 1, wherein the object emotion analysis model comprises a plurality of dynamic feature processing modules, and each dynamic feature processing module is configured to input the dynamic feature of a corresponding type and output a fusion feature corresponding to the dynamic feature; and wherein outputting the emotion analysis result of the target object based on the fusion feature comprises:

splicing the fusion features output by the dynamic feature processing module and a static face feature to obtain spliced features, and inputting the spliced features into a preset second multilayer perceptron to output the emotion analysis result of the target object.

12. The method according to claim 11, wherein the second multilayer perceptron comprises a plurality of branch networks; and wherein inputting the spliced features into the preset second multilayer perceptron to output the emotion analysis result of the target object comprises:

inputting the spliced features into the plurality of branch networks of the second multilayer perceptron respectively, wherein each of the branch networks are preset with a feature mapping mode corresponding to the branch network, and the feature mapping mode comprises: performing linear combination mapping based on a preset facial action unit, performing linear combination mapping based on a plurality of preset basic emotion types, and performing linear characterization mapping based on a positive-negative degree and an intense degree of an emotion; and performing mapping on the spliced features by the branch networks according to the feature mapping modes corresponding to the branch networks, so as to obtain the emotion analysis results output by the branch networks.

13. The method according to claim 1, wherein the multimedia data is video data with video pictures containing the target object; and wherein extracting the static facial feature and the dynamic feature of the target object from the multimedia data comprises:

determining each video frame one by one in the video data as a current video frame;

acquiring the static facial feature from the current video frame;

acquiring the expression change feature from a video frame sequence containing the current video frame, acquiring the sound feature from audio data corresponding to the video frame sequence, and acquiring the language content feature from audio data or subtitle data corresponding to the video frame sequence.

14. The method according to claim 13, further comprising:

acquiring an emotion analysis result corresponding to the current video frame in the video data;

determining that there is an emotion sudden-change video frame in the video data, based on the emotion analysis result corresponding to the current video frame, wherein an emotion analysis result of the emotion sudden-change video frame is a first analysis result, emotion analysis results of video frames adjacent to, before and after the emotion sudden-change video frame are second analysis results, and the first analysis result is different from the second analysis results; and smoothing the emotion analysis result of the emotion sudden-change video frame based on the second analysis results to obtain a smoothed emotion analysis result.

15. The method according to claim 1, wherein the object emotion analysis model is restricted by using a plurality of loss functions during training.

16. The method according to claim 1, wherein the static facial feature is configured to characterize an appearance feature, action and posture features and an expression feature of the target object.

17. An electronic device, comprising a processor and a memory, wherein the memory stores machine executable instructions executable by the processor, and the processor is configured to execute the machine executable instructions to implement an object emotion analysis method, the object emotion analysis method comprising:

acquiring multimedia data associated with a target object, and extracting a static facial feature and a dynamic feature of the target object from the multimedia data, wherein the dynamic feature comprises at least one of an expression change feature, a sound feature or a language content feature of the target object; and inputting the static facial feature and the dynamic feature into an object emotion analysis model, wherein the object emotion analysis model is pre-trained, fusing the static facial feature and the dynamic feature by the object emotion analysis model to obtain a fusion feature, and outputting an emotion analysis result of the target object based on the fusion feature, wherein the object emotion analysis model comprises a dynamic feature processing module, and the dynamic feature processing module is configured to input the dynamic feature of a corresponding type; and wherein fusing the static facial feature and the dynamic feature by the object emotion analysis model to obtain the fusion feature comprises:

inputting, for the dynamic feature processing module, the dynamic feature corresponding to the dynamic feature processing module and the static facial feature of the target object into the dynamic feature processing module; and fusing the static facial feature and the dynamic feature by an attention network in the dynamic feature processing module to obtain the fusion feature, wherein the fusion feature comprises a common key feature for characterizing an emotion, between the static facial feature and the dynamic feature, wherein the method further comprises:

inputting the dynamic feature into a time sequence model, and outputting a context feature of the dynamic feature, wherein the context feature is configured for characterizing a variation trend of the dynamic feature with time; and adding time sequence information into the context feature, and determining the context feature in which the time sequence information is added, as the dynamic feature to be input into the dynamic feature processing module, wherein the time sequence information is configured for indicating time sequence positions of features in the context feature.

18. A non-transitory machine-readable storage medium, wherein the non-transitory machine-readable storage medium stores machine executable instructions, and when invoked and executed by a processor, the machine executable instructions cause the processor to implement an object emotion analysis method, the object emotion analysis method comprising:

acquiring multimedia data associated with a target object, and extracting a static facial feature and a dynamic feature of the target object from the multimedia data, wherein the dynamic feature comprises at least one of an expression change feature, a sound feature or a language content feature of the target object; and inputting the static facial feature and the dynamic feature into an object emotion analysis model, wherein the object emotion analysis model is pre-trained, fusing the static facial feature and the dynamic feature by the object emotion analysis model to obtain a fusion feature, and outputting an emotion analysis result of the target object based on the fusion feature, wherein the object emotion analysis model comprises a dynamic feature processing module, and the dynamic feature processing module is configured to input the dynamic feature of a corresponding type; and wherein fusing the static facial feature and the dynamic feature by the object emotion analysis model to obtain the fusion feature comprises:

inputting, for the dynamic feature processing module, the dynamic feature corresponding to the dynamic feature processing module and the static facial feature of the target object into the dynamic feature processing module; and fusing the static facial feature and the dynamic feature by an attention network in the dynamic feature processing module to obtain the fusion feature, wherein the fusion feature comprises a common key feature for characterizing an emotion, between the static facial feature and the dynamic feature, wherein the method further comprises:

inputting the dynamic feature into a time sequence model, and outputting a context feature of the dynamic feature, wherein the context feature is configured for characterizing a variation trend of the dynamic feature with time; and adding time sequence information into the context feature, and determining the context feature in which the time sequence information is added, as the dynamic feature to be input into the dynamic feature processing module, wherein the time sequence information is configured for indicating time sequence positions of features in the context feature.

* * * * *